Figure 1:
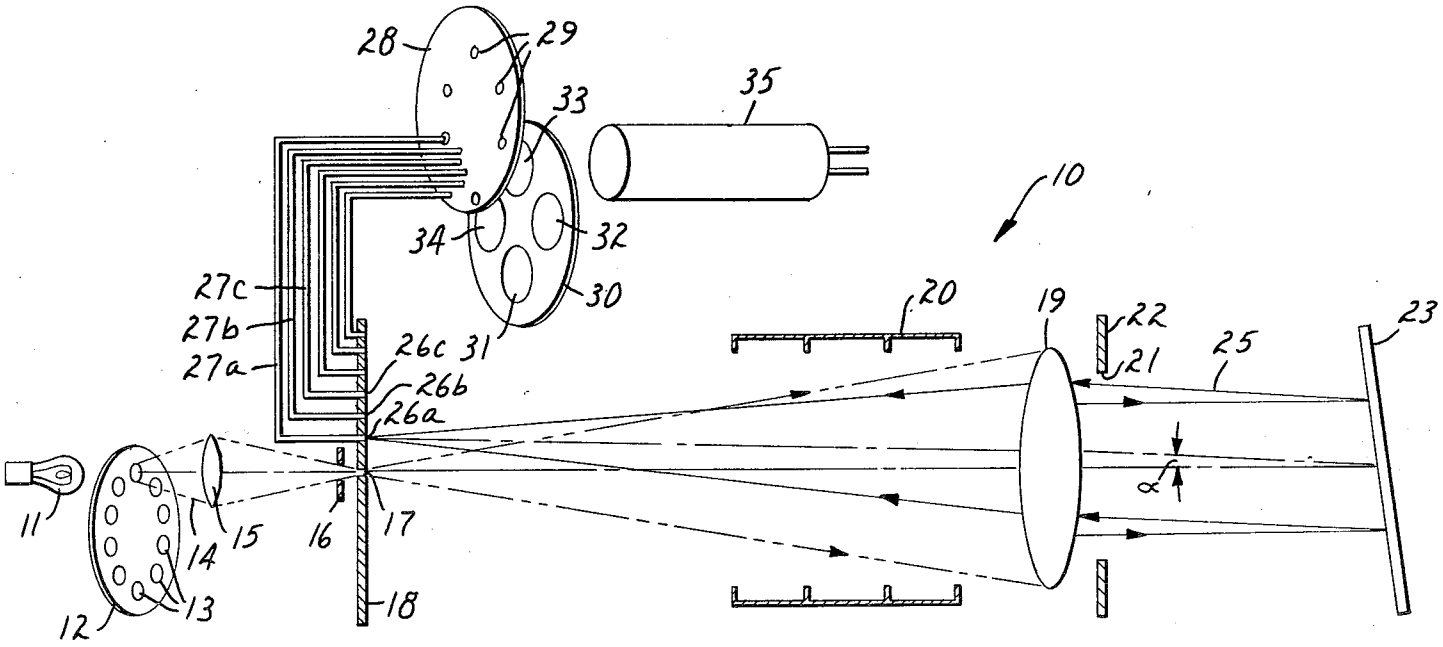
Figure 3:
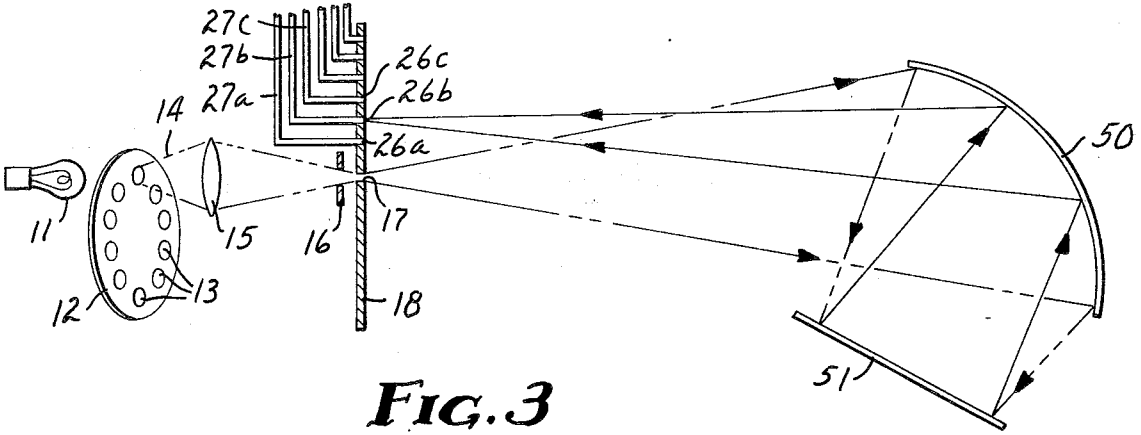
Figure 2:
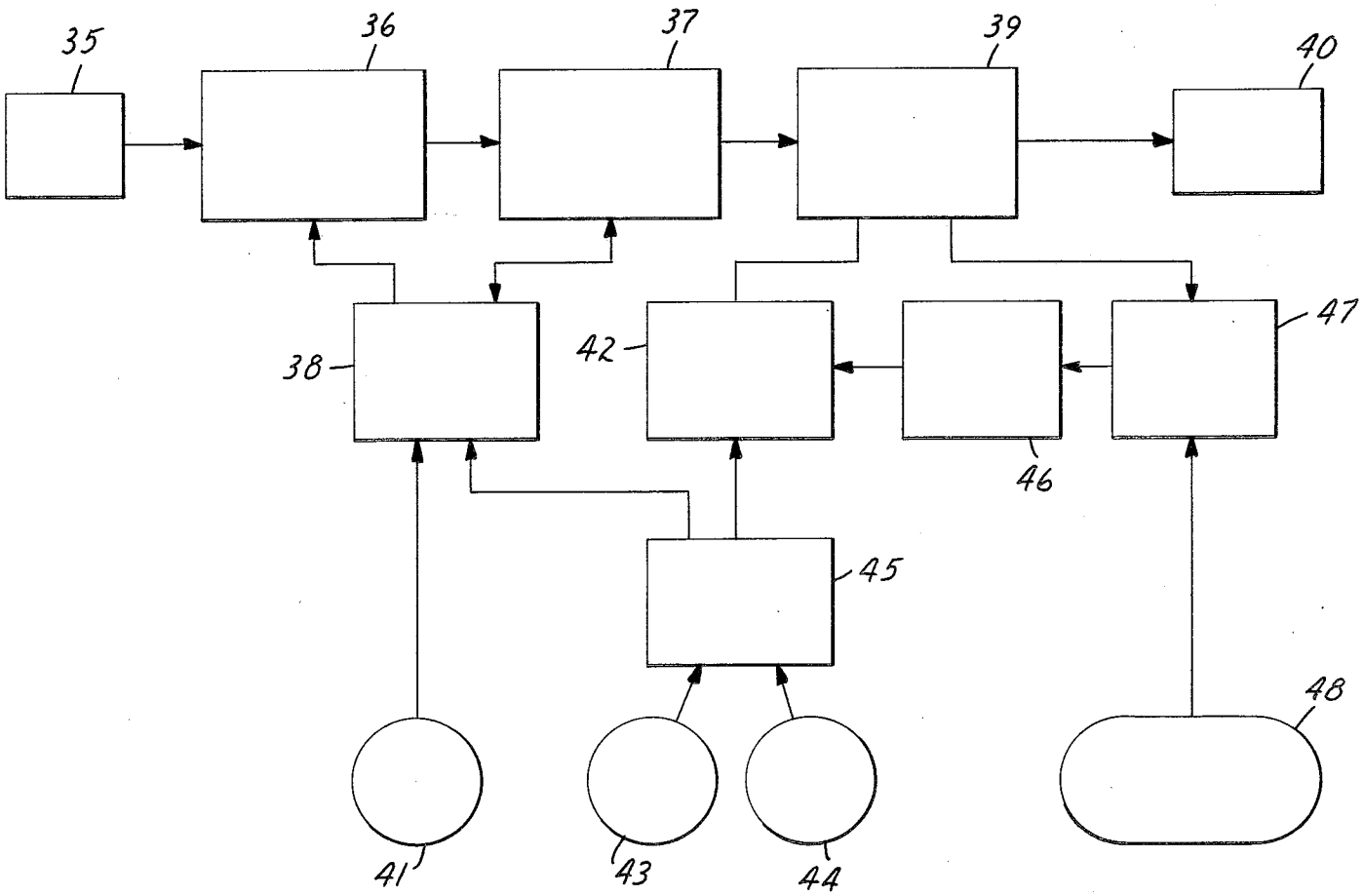

United States Defensive Publication [19] (H) [11] T987,003

Johnson et al. [43] Oct. 2, 1979

[54] RETROLUMINOMETER

[75] Inventors: Norbert L. Johnson, Oakdale; Michael J. Knowd, New Brighton, both of Minn.

[73] Assignee: Minnesota Mining and Manufacturing Company, St. Paul, Minn.

[21] Appl. No.: 929,299

[22] Filed: Jul. 31, 1978

[51] Int. Cl.[2] ..... G01N 21/48

[52] U.S. Cl. ..... 356/445; 356/447

[57] ABSTRACT

A retroluminometer for measuring retroreflectivity of signs or markings at their actual point of use comprises (1) a source of alternating light; (2) optical means for both directing the alternating light onto a sign or marking that is to be tested and for transmitting light retroreflected by the sign or marking onto a panel within the retroluminometer; (3) a matrix of light-transmitting means arranged on the face of the panel; (4) photosensing means optically connected to the light-transmitting means and adjustable to sense and measure the light from different ones of the light-transmitting means, thereby measuring retroreflection at different angles of deviation from the axis of the light beam incident on the sign or marking; and (5) electric circuitry for presenting the photosensed light as a visually-readable measurement. The electric circuitry includes filtering circuitry for filtering out signals having a frequency different from that of the alternating source so as to eliminate the effect of ambient or extraneous light.

1 Claim, 2 Sheets Drawing,

8 Pages Specification

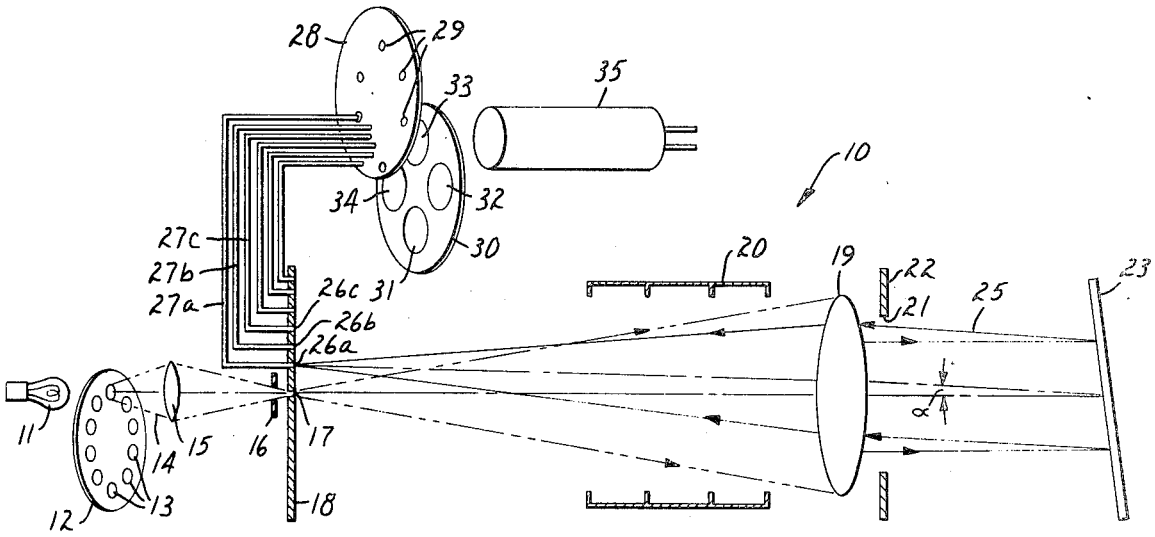

The file of this unexamined application may be inspected and copies thereof may be purchased (849 O.G. 1221, Apr. 9, 1968).